Jan. 30, 1940. S. HAUT Re. 21,338

TEA PACKAGE

Original Filed Nov. 25, 1936

INVENTOR.

Samuel Haut

Reissued Jan. 30, 1940

Re. 21,338

UNITED STATES PATENT OFFICE 21,338

TEA PACKAGE

Samuel Haut, Brooklyn, N. Y.

Original No. 2,092,510, dated September 7, 1937, Serial No. 112,663, November 25, 1936. Application for reissue September 20, 1938, Serial No. 231,451

6 Claims. (Cl. 99—77.1)

This invention relates to an original package of tea, and one of its objects is to provide a package in the form of a teaspoon, made from paper or similar material, in the form of a container with perforated walls, to place a quantity of tea leaves in the container thus provided and to seal the same, so that the bowl of the spoon, forming the container for the tea leaves can be inserted in hot water placed in a serving cup or vessel, and tea brewed in the usual manner, after which the container teaspoon will be removed and discarded, being used but once.

Another object of the invention is to provide a bowl of teaspoon shape adapted to contain a charge of tea sufficient to brew a cup of tea having a cover to hold the tea permanently within the bowl and having a handle attached to one of the parts so that the whole may be used after the manner of a teaspoon to brew and stir the tea. The device is intended is to be made of paper and to serve as the original package in which the tea is sold to replace an insanitary tea ball. The paper material tends to soften under the action of hot water used in making the tea and it is therefore a further object to construct the device in such form that it will not yield its contents or bend even under these adverse conditions.

The handle is reinforced along its length and this reinforcement is continued around the edges of the bowl so that the maximum of stiffness is given to the spoon when used for stirring and at the same time the reinforcement around the edges of the bowl is used to receive the other one of the two members to which the handle is not attached so as to keep the two bowl forming members together.

I have chosen to illustrate the invention in the form in which the handle is attached to and forms a continuation of the bowl portion and in this construction the cover may be fitted into a recess within the periphery of the bowl.

It will be understood that the parts are provided with a series of perforations to give the hot water access to the tea.

With the above and other objects in view the invention consists in certain new and useful constructions, combinations, and arrangements of parts, clearly described in the following specification, and fully illustrated in the drawing, in which.

Figure 1:
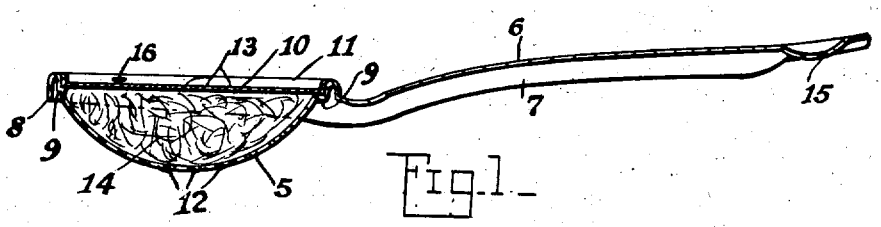
Figure 1 is a longitudinal sectional view, taken on line 1—1 of Figure 2, looking in the direction of the arrows.
Figure 2:
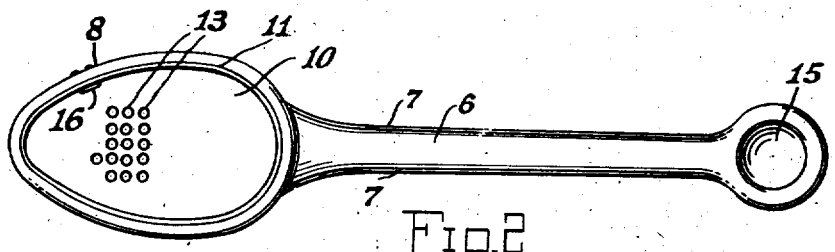
Figure 2 is a plan view of the improved container.

Referring to the drawing there are provided two bowl forming members 5 and 10 which cooperate to form the closed bowl to receive the charge of tea and a handle 6 which is attached to one of the bowl forming members.

As illustrated the member 5 is concave to form the body portion of the bowl of the spoon and the member 10 is flat to form the cover portion thereof.

The handle 6 is provided with a longitudinal flange 7 to stiffen it throughout its length and this flange is continuous with and merges into a flange 8 which extends around the periphery of the bowl. This flange 8 is integral with and stiffens the edge of one of the bowl forming members at the point where the other bowl forming member engages it so that the two bowl forming members are stiffened at the point at which they meet to prevent the soaking apart in hot water. The bowl forming member which is integral with the handle is thus provided with a shoulder or slot around its periphery in which the edge of the other bowl forming member is held.

In the form illustrated I have shown the member 5 integral with the handle as the concave bowl forming member and the member 10 as in the form of a flat disc, thus in the illustration the flange 8 is integral with the member 5.

The bowl forming members are provided with perforations 13 through which the hot water may freely penetrate to reach the tea leaves 14 held within the container. The perforations are of such size and number as experience will determine best suited to promoting quick brewing of the tea leaves, without causing the tea leaves to drop from the bowl or container.

The handle may be formed with a finger seat 15, so that the user may more securely grip the same. The bowl forming members may be locked together by crimping the marginal flange of the inner member against the marginal edge of the other member and if desired staples 16 may be driven through the edge of the parts so that the disc closure will not be removed by any careless user, and the original contents will be sealed against unlawful tampering or substitution.

The spoon is inserted or immersed in the hot water, which is usually placed in a serving cup or vessel, and the spoon is stirred so that the tea is brewed to the desired strength. When the tea has been sufficiently brewed the container may be readily removed from the tea cup or serving vessel, and deposited on the saucer or other object suited for this purpose.

The combined original package thus includes a perforated container comprising a bowl and cover which surrounds the dry tea leaves in the bowl and having a handle which serves to control the container, for insertion, mixing and removal, without exposing the fingers of the user to direct contact with the water in the tea cup or serving vessel.

Due to the fact that the marginal edge of the bowl portion of the device is reinforced by the depending flange the bowl forming portion will retain its shape for a prolonged period, even when subjected to the hot water.

Some persons use a spoon for stirring the tea and to mix in sugar or cream, and this improved package may be used for this purpose as well as for brewing the tea. Due to the shape of the device the handle will always extend above the cup so that it may be readily grasped and removed whenever the tea has reached the desired strength, thus avoiding the difficult experiences with tea balls when they fall within the cup and cannot be readily regained.

Due to the fact that the handle flange forms a part of the reinforcing system for the container, it is possible to make the improved original package by automatic machinery, by direct die pressure operation, from strip stock, and to fill the container bowls by automatic filling machinery, with the fewest possible operations.

The use of the double edge for the container bowl also permits the use of thinner and more economical stock.

The improved original package will be marketed in suitable boxes or cartons, sealed against dirt, and the handle has sufficient display surface on the top and on the sides thereof to carry the name of a hotel or other eating place, or the name of the maker of the tea.

The handle may also carry the advertising messages of other concerns, and the teaspoon package given away, either as a premium or as an attention exciting gift.

The paper or other stock employed may be rendered water resistant or water proof, by any method or means which is adapted for the purpose, but a suitable water resisting stock is available, which has been found to retain its original stiffness for a considerable time, after immersion in hot water, and which can be pressed into the desired form under production conditions.

I claim as new:

1. A tea package comprising a teaspoon shaped vessel of paper having a handle and a perforate bowl of a size to contain a single charge of tea, cover of paper for closing said bowl, said bowl and said cover comprising two elements, one of which has a peripheral groove facing inwardly to receive the periphery of the other element and having its material flanged over to reinforce its grip upon the other element and a charge of tea within said bowl.

2. A tea package comprising a teaspoon shaped vessel of paper having a handle and a perforate bowl of a size to contain a single charge of tea, a cover of paper for closing said bowl, said bowl having a peripheral groove facing inwardly to receive and hold the edges of said cover and a charge of tea within said bowl.

3. A tea package comprising a teaspoon shaped vessel of paper having a handle and a perforate bowl of a size to contain a single charge of tea, a cover of paper for closing said bowl, said bowl having a peripheral groove facing inwardly to receive and hold the edges of said cover, and being flanged over to strengthen its periphery to assist in holding said cover in place and a charge of tea within said bowl.

4. A tea package comprising a perforate paper bowl and a paper cover for closing said bowl, said bowl and said cover comprising two elements, one of which has a peripheral groove facing inwardly to receive the periphery of the other element, said grooved element having its material flanged over to reinforce its grip upon the other element, a handle attached to said flanged element and continuous therewith and a charge of tea within said bowl, the whole forming a teaspoon shaped package.

5. A tea package comprising a perforate paper bowl and a paper cover for closing said bowl, said bowl and said cover comprising two elements, one of which has a peripheral groove facing inwardly to receive the periphery of the other element, said grooved element having its material flanged over to reinforce its grip upon the other element, a handle attached to said flanged element having a longitudinal flange on each side thereof merging with the flange on said flanged element.

6. A tea package comprising an element having a handle and a bowl forming member integral therewith, said element having a peripheral flange extending down the edges of said handle and around the bowl forming member to reinforce said handle and the periphery of said bowl forming member, a second bowl forming member having its periphery fitting tightly within the periphery of the first mentioned bowl forming member, one of said bowl forming members being concaved to provide a receptacle for a charge of tea and said bowl forming members being provided with perforations.

SAMUEL HAUT.